United States Patent
Sutehall et al.

(10) Patent No.: US 9,529,170 B2
(45) Date of Patent: Dec. 27, 2016

(54) MULTIPURPOSE OPTICAL FIBRE DROP CABLE

(75) Inventors: Ralph Sutehall, Eastleigh (GB);
Martin Davies, Eastleigh (GB); Ian Dewi Lang, Eastleigh (GB);
Jean-Pierre Bonicel, Rueil Malmaison (FR)

(73) Assignees: PRYSMIAN TELECOM CABLES AND SYSTEMS UK LIMITED, Eastleigh, Hampshire (GB); DRAKA COMPTEQ FRANCE SAS, Argenteuil (FR)

( * ) Notice: Subject to any disclaimer, the term of this patent is extended or adjusted under 35 U.S.C. 154(b) by 131 days.

(21) Appl. No.: 14/236,410

(22) PCT Filed: Aug. 4, 2011

(86) PCT No.: PCT/IB2011/002162
§ 371 (c)(1),
(2), (4) Date: May 6, 2014

(87) PCT Pub. No.: WO2013/027906
PCT Pub. Date: Feb. 7, 2013

(65) Prior Publication Data
US 2014/0241677 A1  Aug. 28, 2014

(51) Int. Cl.
*G02B 6/44* (2006.01)
*B29D 11/00* (2006.01)

(52) U.S. Cl.
CPC ......... *G02B 6/443* (2013.01); *B29D 11/00701* (2013.01); *G02B 6/4433* (2013.01);
(Continued)

(58) Field of Classification Search
USPC .................................................. 385/103, 113
See application file for complete search history.

(56) References Cited

U.S. PATENT DOCUMENTS 4,723,831 A  2/1988  Johnson et al.
4,804,245 A  2/1989  Katayose et al.
(Continued)

FOREIGN PATENT DOCUMENTS

DE  299 13 255  1/2001
EP  0 886 159  12/1998
(Continued)

OTHER PUBLICATIONS

Draka, "Cable Design, FTTH Access Flextube® Cable, BendBright$_{xs}$ Fibre, Aerial Dielectric, Separable For Indoor Installation," Std FVDIFT-D2-KHKP-(2-4)-BBXS-0e, Flextube Cable of Draka, (Jan. 15, 2010).
(Continued)

*Primary Examiner* — Sung Pak
(74) *Attorney, Agent, or Firm* — Finnegan, Henderson, Farabow, Garrett & Dunner, L.L.P.

(57) ABSTRACT

A telecommunication cable includes at least one optical fiber unit surrounded by a low fire hazard halogen free polymeric inner sheath that is covered by and in contact with a peelable, environmentally resistant polymer outer sheath. At least two discrete strength members are embedded into the low fire hazard halogen free polymeric inner sheath. The cable is intended for outdoor and indoor use.

17 Claims, 3 Drawing Sheets

(52) U.S. Cl.
CPC .......... *G02B 6/4436* (2013.01); *G02B 6/4416* (2013.01); *Y10T 29/49817* (2015.01)

(56) References Cited

U.S. PATENT DOCUMENTS

| | | | |
|---|---|---|---|
| 6,041,153 | A | 3/2000 | Yang |
| 6,055,351 | A | 4/2000 | Yang et al. |
| 6,377,738 | B1 | 4/2002 | Anderson et al. |
| 2002/0044751 | A1 | 4/2002 | Logan et al. |
| 2002/0126970 | A1 | 9/2002 | Anderson et al. |
| 2003/0133679 | A1* | 7/2003 | Murphy ................ C03C 25/106 385/128 |
| 2005/0002623 | A1* | 1/2005 | Sutehall ............... G02B 6/4422 385/101 |
| 2008/0273845 | A1 | 11/2008 | Weimann |
| 2009/0245740 | A1 | 10/2009 | Weimann |
| 2009/0297106 | A1* | 12/2009 | Pizzorno et al. ............. 385/109 |
| 2010/0202741 | A1 | 8/2010 | Ryan et al. |
| 2011/0002588 | A1* | 1/2011 | Osato ................... G02B 6/4429 385/113 |
| 2012/0224818 | A1* | 9/2012 | Karayianni ................... 385/100 |

FOREIGN PATENT DOCUMENTS

| | | |
|---|---|---|
| EP | 0 893 801 | 1/1999 |
| EP | 0 893 802 | 1/1999 |
| EP | 0 985 946 | 3/2000 |
| EP | 1 006 385 | 6/2000 |
| EP | 1 939 660 | 7/2008 |
| GB | 2 368 404 | 5/2002 |
| WO | WO 99/05688 | 2/1999 |

OTHER PUBLICATIONS

International Standard, "Tests on Electric and Optical Fibre Cables Under Fire Conditions," CEI/IEC 60332-1-2, pp. 1-21, (2004).
International Search Report from the European Patent Office for International Application No. PCT/IB2011/002162, mailed Feb. 29, 2012.

* cited by examiner

MULTIPURPOSE OPTICAL FIBRE DROP CABLE

CROSS REFERENCE TO RELATED APPLICATION

This application is a national phase application based on PCT/IB2011/002162, filed Aug. 4, 2011, the content of which is incorporated herein by reference.

BACKGROUND OF THE INVENTION

The present invention relates to an optical fibre cable for telecommunication, in particular to a drop optical fibre cable suitably deployed both outdoor and indoor.

As "drop cable" it is meant an optical cable operating as the last link of an access distribution network, typically serving just one subscriber.

Optical fibre telecommunication cables for outdoor use should have mechanical characteristics such to withstand environmentally challenging situation. For example, as reported by GB2368404, aerial (or overhead) telecommunication drop cables are suspended from poles in a catenary and sag due to their own weight. The extent of the sag on installation is determined by the tension in the drop cable and is designed to be within a range of values determined by the acceptable drop cable tension and the acceptable extent of eventual sag to avoid hazard. In addition, externally mounted drop cables are subject to additional variable loading due to wind force and settling of moisture or ice formation. This additional loading results in strain in the drop cable and will affect all the components of the cable including the data carrying components.

Reinforcing elements are typically provided into the cable for increasing resistance to strain stress. For example, strength members, preferably two diametrically opposed ones, are provided embedded in the outermost sheath of the cable as shown, for example, in US 20100202741 and in U.S. Pat. No. 4,723,831. In the Applicants experience, the closer the strength members are to the surface of the cable the more efficient the load transfer is. The device securing the cable to the pole usually acts to increase the amount of radial compression on the cable, so as to increase the load transfer to the cable strength members as the load on the cable increases. If the radial thickness of the cable sheath over the strength member is too thin then the sheath material will fracture, but if the said thickness is too high then the amount of load being transferred to the strength member is reduced, as the cable sheath acts as a buffer and sheath shear and possibly break or slippage may occur.

The outer sheath of an aerial drop cable is typically made of a material having suitable mechanical and environmental resistance for outdoor use in the planned cable location. Example of materials apt to the scope are polyethylene, in particular high density polyethylene (HDPE) (see, for example, US2005002623), and polyvinylchloride (PVC) (see, for example, U.S. Pat. No. 4,723,831).

A multipurpose telecommunication drop cable, suitable both for outdoor (external, overhead, underground) and indoor use is desired.

According to some national standards, a cable containing no-low fire hazard materials can be installed within a building in limited length only. If the indoor length required for the connection is exceeded the cable must be changed to low fire hazard cable and this involves the installation of a transition joint. Alternatively the cable must be installed in some kind of containment. Both these solutions are expensive.

A cable having low fire hazard sheathing is not suitable for outdoor use where resistance to environmental (both mechanical and chemical) stresses is required, which may not sufficiently provided by the low fire hazard sheathing.

The already mentioned U.S. Pat. No. 4,723,831 relates to an optical fiber cable that can be used in the local distribution network, including in external plant applications such as distribution or buried service cable, and indoor applications such as riser or plenum cable. Said cable includes a first jacket, typically comprising a polyvinyl chloride material, a core member comprising at least one optical fiber, and a core wrap of woven glass fibers loosely surrounding the optical fiber(s). The cable further comprises three non-metallic strength members (or groups of strength members) completely embedded in the first jacket and coupled thereto. The voids between the optical fiber(s) and the core wrap are filled with a fire retardant grease composition.

Strain resistance is important for an indoor cable, too. During indoor deployment, the drop cable can be pulled for considerable length and through tortuous and also narrow passage. In addition, an indoor cable can suffer from temperature fluctuations, in particular from shrinkage at low temperatures after deployment. The presence of strength members is important for providing the cable with a suitable resistance to strain stresses. In addition, it is desirable to have strength members capable of bearing axial compression loads, such as those due to thermal shrinkage caused by temperature fluctuations.

Flextube™ cable of Draka described in the brochure Std FVDIFT-D2-KHKP-(2-4)-BBXS-0e of Jan. 15, 2010 comprises a micromodule housing optical fibres surrounded by an inner sheath of low smoke halogen free material. Said inner sheath, in turn, is enveloped by a dielectric reinforcement made of glass fibre reinforced plastic material and aramid yarns. An outer sheath made of HDPE embedding two diametrically oppose strength members surrounds the whole. The cable is intended for overhead installation on poles, installation in ducts or on front wall. Indoor installation of the cable is feasible after removal of the outer sheath. The presence of a dielectric reinforcement is said to provide said cable with resistance to strain stresses even when the outer sheath and the strength members embedded therein are removed.

Whilst aramid yarns as strength members are well proven, there may be a problem in using them when there is a defined maximum tensile strength requested for the cable. The load at which aramid yarns ultimately breaks is not as well defined as for metal or grp (glass reinforced polymer) strength members, but rather lays in a range which may provide uncertainty in the application, unless the size is increased, resulting in very high costs. In addition, aramid yarns would not provide resistance to axial compression, e.g. due to thermal shrinkage.

Strength members made of grp have a lower strength to diameter ratio than that of metallic strength member. As a consequence, if a cable endowed with grp members is desired to have the same tensile resistance than a cable with metallic strength members, such cable should have a greater outer diameter.

The Applicants faced the problem of providing a drop telecommunication cable suitable both for outdoor and to indoor use. In particular, the Applicants faced the problem of providing a cable with suitable strain and environmental resistance when used outdoor, and of retaining a sufficient strain resistance and fire performances when used indoor.

Strength members location close to the outer cable surface was believed to be required for transferring the load from the securing device to the strength members, but if said strength members are embedded in the outer sheath, made of a material suitable for outdoor application but not fire resistant, they get lost with the removal of the outer sheath at the moment of the indoor deployment.

The Applicant planned to design an optical fibre drop cable with strength members embedded into an inner, fire resistant sheath, while providing a suitable load transfer from the securing device to strength members so deeply embedded in the cable structure.

SUMMARY

The present disclosure relates to a telecommunication cable comprising at least one optical fibre unit surrounded by low fire hazard halogen free polymeric inner sheath that is covered by and in contact with a peelable, environmentally resistant polymer outer sheath, at least two discrete strength members, preferably diametrically opposed strength members, being embedded into the low fire hazard halogen free polymeric inner sheath.

For the purpose of the present description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

By "discrete strength members" it is meant strength member elements in the form of rods, strands or the like, as opposed to strength member layers, such as layers of aramid yarns or the like.

In the present description and claims, as "optical fibre unit" is intended a single optical fibre, optionally buffered, or a plurality of optical fibres assembled to form a multi-fibre unit, optionally contained in a tube or micromodule.

The at least optical fibre unit can be either encircled by the low fire hazard halogen free polymeric inner sheath or embedded therein.

In a preferred embodiment, at least one optical fibre unit is stranded with at least one stranding element. The stranding can be either SZ or helical. The stranding configuration provides the cable with a positive excess of optical fibre length. A positive excess of optical fibre length can help and relief the optical fibre strain stress.

The stranding element can be selected from an optical fibre unit; a metallic wire, or strand or twisted pair; or a polymeric rod or tube.

In a preferred embodiment, the metallic stranding element is a twisted pair of insulated electric conductors. The insulated electric conductors can be made of copper, aluminium or composite thereof.

In another preferred embodiment, metallic wire stranding element is an insulated electric conductor.

In a preferred embodiment, at least one optical fibre unit is stranded with a pair of twisted insulated electric conductors, so as to result in a hybrid cable. A hybrid cable is a cable containing both fibre optic and an electrical conductor or conductors, either for power supply or in the form of a twisted pair, suitable, for example, for providing power supply to the telephonic apparatus in emergency situations when the mains electrical supply to the premises in which the telephone is located has been interrupted, or for providing an alternative telephonic connection through the twisted pair.

According to the present description and claims as "low fire hazard halogen free polymeric inner sheath" is intended a sheath made of a polymeric material compliant with the requirements of IEC 60332-1-2 (2004).

A preferred example of a low fire hazard halogen free polymeric inner sheath is based on ethylene copolymer added with inorganic flame retardant filler, for example an inorganic oxide or hydroxide.

In the outer surface of the inner sheath of the present cable one or, preferably, two grooves can be provided. For example, a groove is provided in a plane forming an angle of substantially 90° with the plane of the diametrically opposed longitudinal strength members. The groove allows identifying a proper plane for performing a longitudinal cut into the inner sheath at the time of accessing the optical fibre unit contained therein.

According to the present description and claims as "environmentally resistant polymer outer sheath" is intended a sheath made of a material capable of resistance against chemical and mechanical stresses likely to occur during the intended outdoor use of the cable. For example, a suitable environmentally resistant material is polyethylene, in particular HDPE.

The environmentally resistant polymer outer sheath of the present cable is said to be peelable. As "peelable" it is intended an outer sheath detachable from the underlying inner sheath without damaging the inner sheath and without substantially leaving residues thereupon.

By way of example, the outer sheath can be peeled off the inner sheath by indenting a line along the outer sheath and applying a radial stripping force of from 0.1 N to 10 N, preferably from 0.1 N to 5 N, to the outer sheath.

The cable can comprise a separation element, for example a rip cord, to ease the outer sheath peeling off. The separation element can be positioned at the interface between outer sheath and inner sheath. For example, a separation element can be provided in a plane forming an angle of substantially 90° with the plane of the diametrically opposed longitudinal strength members.

The strength members embedded into the low fire hazard halogen free polymeric inner sheath are discrete (lumped) elements.

The strength members can be made of dielectric material, such as rods of glass or aramid fibres reinforced resin, or, alternatively, they can be made of metal, for example in form of wires or strands of metallic wires, for example brass plated steel wires.

In a preferred embodiment the cable comprises two diametrically opposed strength members. More preferably the two diametrically opposed strength members are metallic.

The telecommunication cable of the disclosure is preferably a drop cable intended for outdoor and indoor use. Examples of outdoor use of the present cable are underground, aerial and external to building walls. The present cable results particularly advantageous in aerial (or overhead) application where the cable is typically suspended on two or more poles.

When the cable is used in suspension installation, the use of strength members made of metal may be advantageous to withstand the challenging environmental conditions of this application. However the coexistence of live aerial electric conductors can cause electric voltage arcing across the metallic strength members. In this case, the cable can be provided with an outer sheath thick enough to hinder the electric field.

An advantage provide by the present cable, in particular by the embedding of the strength members into the low fire hazard halogen free polymeric inner sheath, is that the cable can be deployed in suspension installation even when the strength members are metallic ones. It has been found that the position of said strength members is sufficiently far from the cable outer surface to provide the cable with a satisfactory short circuit performance.

As the strength members are embedded in the inner sheath, in turn surrounded by the outer sheath, their position is sufficiently away from the cable surface in spite of the reduced thickness of the outer sheath so as to provide the desired electric performance.

Preferably, the outer sheath of the present cable has a thickness of at most 10% of the outer diameter of the cable. This parameter is remarkable when compared to prior cables for use in aerial installation, where the outer sheath has a thickness 20% or more of the outer diameter of the cable.

The reduction of the outer sheath thickness brings about a number of advantages:

the compression exerted by the device securing the cable to the pole in outdoor deployment is sufficient to avoid the detachment/sliding of the outer sheath from/on the inner sheath under longitudinal strain stresses.

the bonding force ensuring the mechanical congruence strain between outer sheath and inner sheath is lowered.

the peelability of the outer sheath is eased.

With "mechanical congruence" it is meant the capacity of two or more parts of moving or withstand strain substantially as a whole.

Preferably, a cable including three optical fibre units with twelve optical fibres each, or two optical fibre units (with twelve optical fibres each) stranded with a twisted pair of insulated conductors has an outer diameter of from 6 to 7 mm.

The use of metallic strength members in the cable of the disclosure provides another advantage. The use of metallic strength members results in a cable with an enhanced tensile performance (maximum working tension of 1300-1500 N) compared with that of one using non-metallic strength members (maximum working tension of 800 N).

The increased tensile performance together with the limited cable outer diameter make the present cable suitable for longer spans or more extreme wind and ice loading than those with non-metallic strength members, as it will be shown in the following.

The installation process of the cable of the present disclosure comprises laying the cable from an outdoor location (for example, from an outdoor pole where the cable is secured) into an indoor location and peeling off the peelable outer sheath in the cable section that is to be located indoor.

The peeling off of the outer sheath is carried out by known technique employing, for example, sheath stripper or sheath splitter devices, or with the help of a separation element comprised within the cable, such as a ripcord or the like.

In case the cable comprises at least one optical fibre unit stranded with at least another element, the manufacturing process preferably comprises a step of oscillating (in S-Z fashion) or stranding (in a continuous helix) the elements to be stranded (the optical fibre unit or units and the other stranding element or elements) before a first sheathing step where the inner sheath is extruded over the stranded unit (the optical fibre unit or units and the other stranding element or elements) embedding the diametrically opposed strength members. A second sheathing step is then carried out to extrude the outer sheath over and in contact with the inner sheath.

The first and second sheathing steps are advantageously carried out at the same time or immediately one after the other. Preferably, the first and second sheathing steps are carried out by a dual extrusion head so that the inner sheath and the outer sheath are coextruded. This is advantageous because extruding the outer sheath over and in contact with a still hot inner sheath provides a thermal bonding of the materials.

When the outer sheath layer is applied immediately after the inner sheath layer, the temperature of the inner sheath layer is preferably decreased by less than 10% with respect to the inner sheath layer extrusion temperature.

Both in case of co-extrusion and of extrusion of one layer immediately after the other, the temperature difference between extruded inner sheath and outer sheath material to be extruded shall be selected by the skilled person in view of the kind of materials used for outer and inner sheath. If the temperature difference is too great the materials will thermally fuse together, at least partially, thereby increasing the peeling force, while if it is too small then there would be little or no adhesion between the inner and outer sheaths and this could introduce a 'slip layer' between the inner and outer sheaths thus limiting the strain resistance of the cable.

Preferably, when the outer layer is made of HDPE and the inner layer is a silicone rubber based polymer compound, the extrusion temperature of the outer sheath layer 6 is from 40° C. to 70° C. higher than the temperature of the inner sheath layer 4 where the outer sheath layer 6 is extruded over the inner sheath layer 4.

BRIEF DESCRIPTION OF THE DRAWINGS

The present invention will become fully clear by reading the following detailed description, to be read by referring to the accompanying drawings, wherein.

DETAILED DESCRIPTION OF PREFERRED EMBODIMENTS

Figure 1:
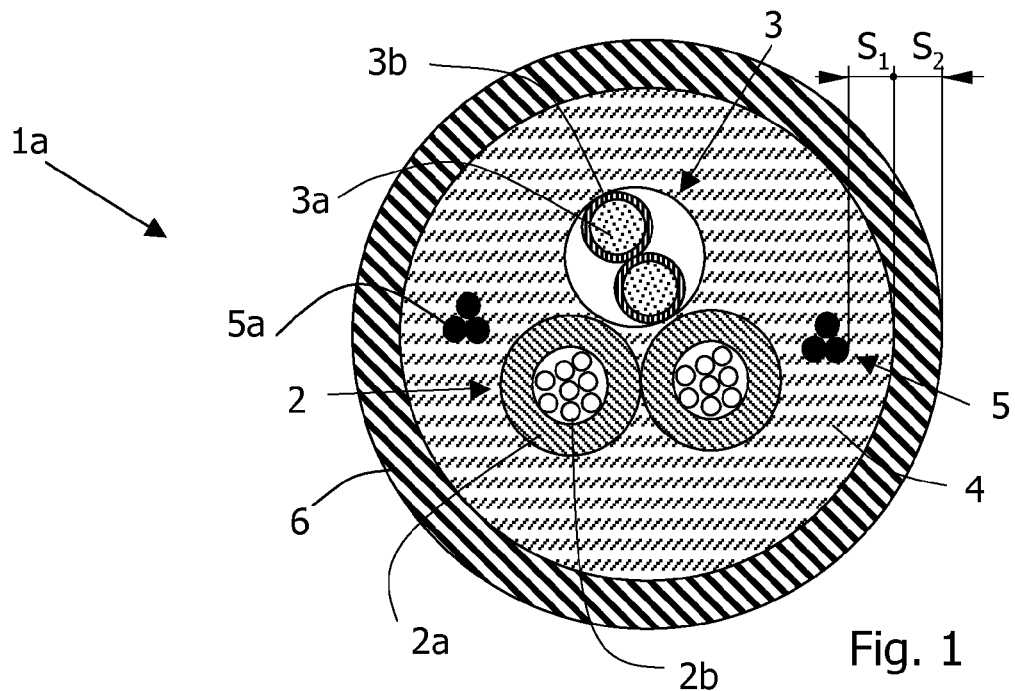
FIG. 1 is a cross section view of a cable according to the present disclosure.

FIG. 1 shows a cable is according to the present disclosure. Cable 1*a* includes two optical fibre units 2 each comprising a tube 2*a* housing a number of optical fibre 2*b* (generally twelve, though the drawing shows eight only).

Typically the optical fibres 2*b* are loosely housed within the tube 2*a*, so that substantially no mechanical coupling is there between fibres 2*b* and tube 2*a*, thereby preventing a load applied to the tube from being transmitted to the fibres.

The optical fibre unit 2 is stranded with a stranding element that, in the depicted case, is a twisted pair 3 of insulated electric conductors, each comprising a copper conductor 3*a* surrounded by an insulating layer 3*b*. The insulating layer 3*b* can be made, for example, of a mixture of propylene homopolymer or copolymer and ethylene copolymer comprising an inorganic filler, for example aluminium or magnesium hydroxide, as described, for example, in EP 0 893 801, EP 0 893 802 or WO 99/05688.

Optical fibre units 2 and stranding element 3 are embedded in an inner sheath 4.

The inner sheath 4 is made of low fire hazard halogen free polymeric compliant to the requirements of IEC 60332-1-2 (2004). Suitable materials for inner sheath 4 are, for example, ethylene copolymer thermoplastic halogen free polymers marketed under the name Megolon® by AlphaGary. Alternatively, a mixture of propylene homopolymer or copolymer and ethylene copolymer comprising an inorganic filler, for example aluminium or magnesium hydroxide, as described, for example, in EP 0 893 801, EP 0 893 802 or WO 99/05688 can be used.

Two diametrically oppose strength members 5 are embedded into the inner sheath 4. In particular, each strength member 5 is composed by three wires 5a, for example brass plated steel wires having each a diameter of 0.32 mm.

The inner sheath 4 is surrounded by and in contact with a peelable, environmentally resistant outer sheath 6. By away of example, the outer sheath 6 is made of HDPE.

For example, the outer sheath has a thickness of 0.5 mm in a cable having an outer diameter of 6.0 mm and comprising two optical fibre units (with twelve fibres each) having an outer diameter of 1.3 mm and stranded with a twisted pair of insulated electric conductors. The thickness of the outer sheath is about 8% of the cable outer diameter. In this example, the diameter of the inner sheath 4 is 5.0 mm, which becomes the outer diameter of the cable after the removal of the outer sheath 5 in order to deploy cable 1 indoor.

Figure 2:
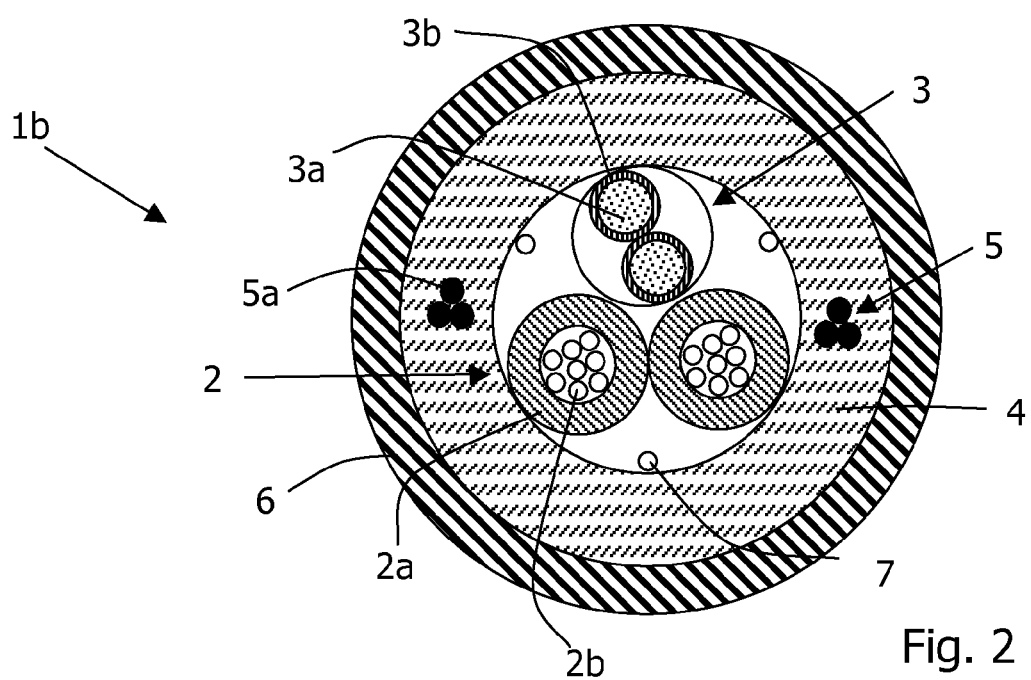
FIG. 2 is a cross section view of another cable according to the present disclosure.

FIG. 2 shows another example of cable according to the disclosure. The reference numbers are the same as in FIG. 1 for corresponding elements. In cable 1b of FIG. 2 two stranded optical fibre units 2 and a twisted pair 3 of insulated electric conductors are encircled by an inner sheath 4.

Water swellable elements 7 are provided within the volume encircled by the inner sheath 4. Elements 7 can be in form of yarns or tapes of water absorbing material capable of blocking water flow accidentally penetrated into the cable.

Figure 3:
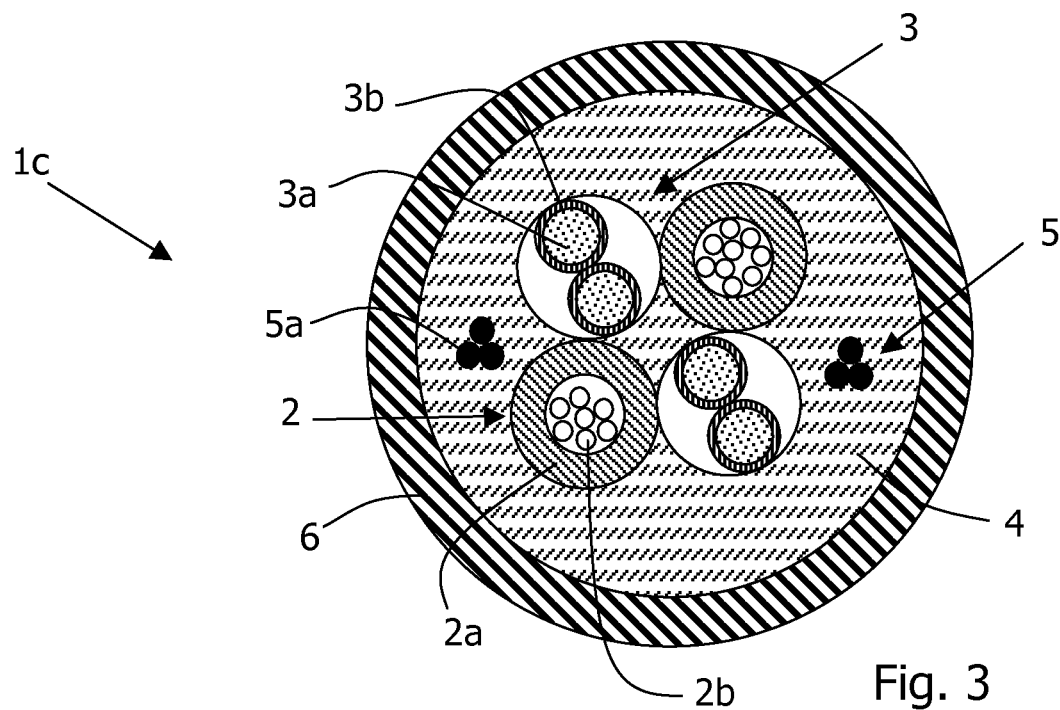
FIG. 3 is a cross section view of another cable according to the present disclosure.

FIG. 3 shows another example of a cable according to the disclosure. The reference numbers are the same as in FIG. 1 for corresponding elements. In the cable 1c of FIG. 3 two optical fibre units 2 are stranded with two twisted pairs 3 of insulated electric conductors and embedded in an inner sheath 4.

Figure 4:
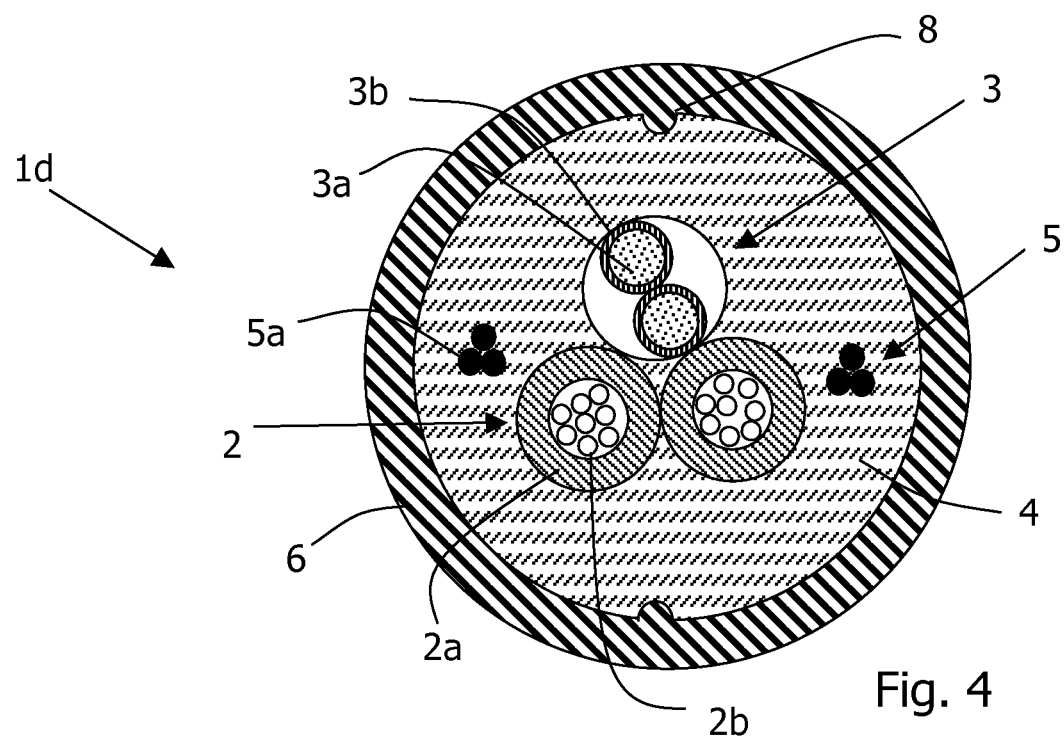
FIG. 4 is a cross section view of another cable according to the present disclosure.

FIG. 4 shows another example of a cable according to the disclosure. The reference numbers are the same as in FIG. 1 for corresponding elements. In the cable 1d of FIG. 4 two diametrically opposed grooves 8 are provided into the outer surface of the inner sheath 4. Said grooves 4 are provided for identifying the proper plane for longitudinally cutting the inner sheath 4 without interference by the strength members 5.

Figure 5:
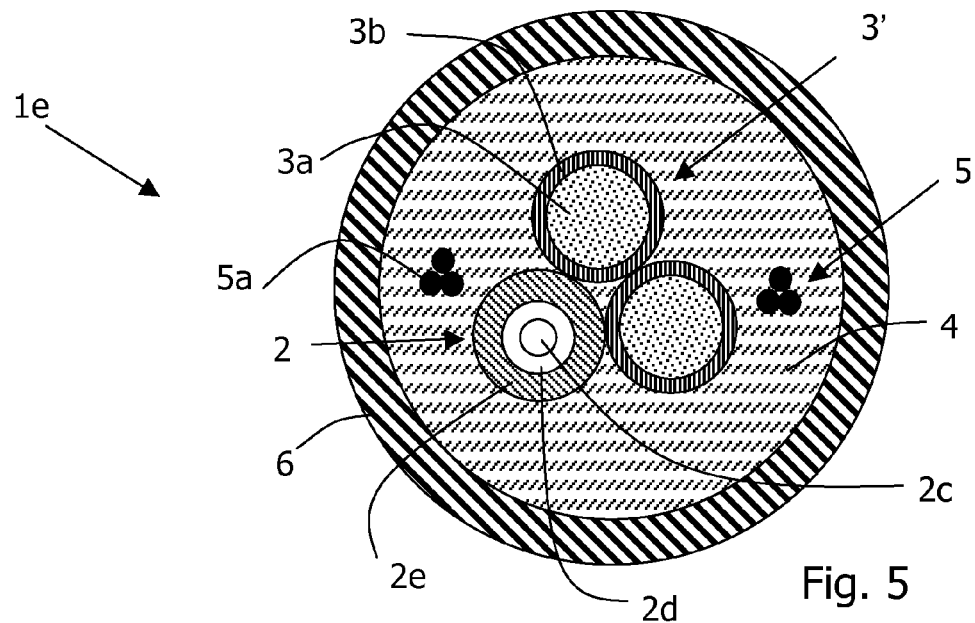
FIG. 5 is a cross section view of another cable according to the present disclosure.

FIG. 5 shows another example of a cable according to the disclosure. The reference numbers are the same as in FIG. 1 for corresponding elements. In the cable 1e of FIG. 5 an optical fibre unit 2 comprises an optical transmitting core 2c surrounded by a coating system 2d (made, for example, by one or two layers of radiation curable material), the whole being enclosed in a buffer 2e (made, for example, of thermoplastic material). The optical fibre unit 2 is stranded with two insulated electric conductors 3' and embedded in an inner sheath 4.

Figure 6:
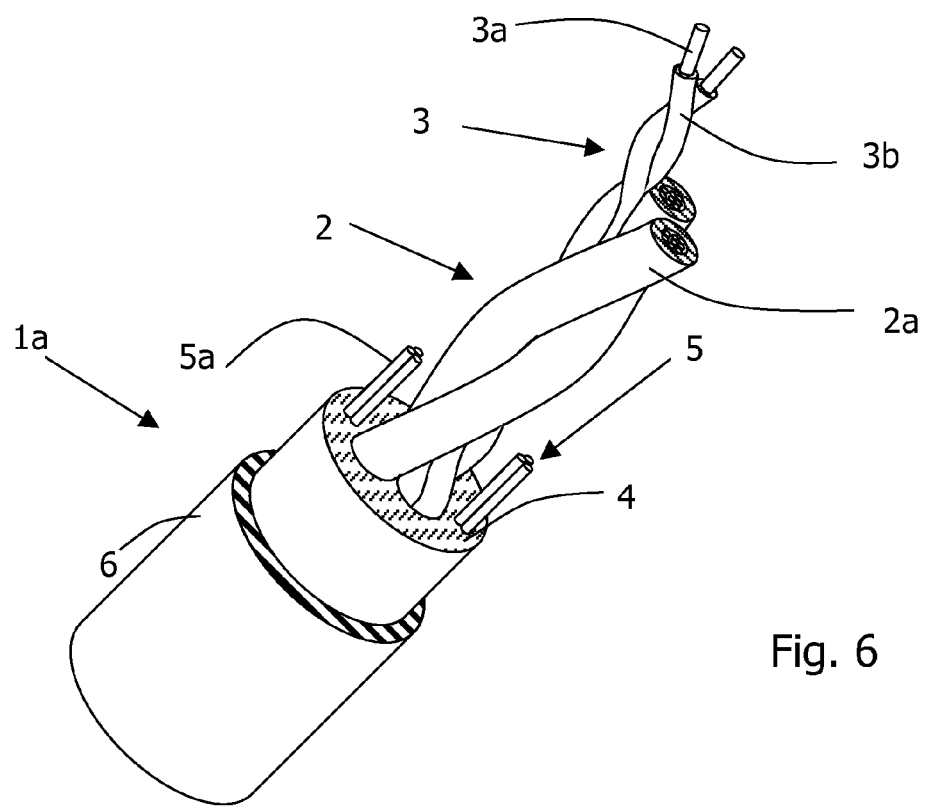
FIG. 6 is a perspective view of a cable according to the present disclosure.

FIG. 6 shows a perspective view of the cable of FIG. 1. The reference numbers are the same as in FIG. 1 for corresponding elements. The present figure shows how the insulated electric conductors are twisted to form the twisted pair 3, and how the twisted pair 3 is stranded with the optical fibre units 2.

Tests were performed on cables with the above described construction and such tests showed that a cable according to the present disclosure can withstand a short circuit in excess of 15 kV between the cable outer surface and the metallic strength members.

This is believed to be enabled by the thickness of dielectric material provided between the metallic strength members and the outer surface of the cable (in its configuration for outdoor use), such thickness being due to the sum of the thickness of the inner layer material over the metallic strength members (ref. $S_1$ in FIG. 1) and the thickness of the outer layer (ref. $S_2$ in FIG. 1).

The combined thickness $S_1+S_2$ turns out to be high enough to provide the desired electric performance, while being thin enough to ensure an effective coupling between the device securing the cable to the pole (a clamping element or the like), acting on the outer surface of the cable (i.e. on the outer sheath), and the strength members, which finally bear the applied axial load.

When the cable according to the present disclosure comprises metallic diametrically opposed strength members it can be deployed outdoor in suspension configuration with spans greater than those possible for an analogous cable comprises non-metallic (dielectric) diametrically opposed strength members. As "span" it is here intended the cable length in suspension between two poles.

For example, in a condition where wind speed of 80 km/h, ice thickness of 5 mm and minimum temperature of −30° C. are foreseen, a cable according to the disclosure with metallic diametrically opposed strength members can be deployed outdoor in suspension configuration with spans of 95 m, while a similar cable with dielectric diametrically opposed strength members can be deployed outdoor in suspension configuration with spans of 46 m.

In order to attempt to achieve the 95 m-span configuration with non-metallic strength members it would be necessary to increase the cross-sectional area of strength member. To achieve this it would be necessary to increase the size of cable which would increase the affect of wind and ice loading which will decrease the effectiveness of the increase in cross-sectional area of strength member.

A cable with an inner sheath made of thermoplastic Megolon® and the outer sheath made of HDPE was manufactured by co-extruding said sheaths as follows. The extrusion temperature of the inner sheath material was of about 160° C. and the outer sheath was be extruded onto the inner sheath at a temperature of about 220° C.

These conditions were found suitable to provide sufficient adhesion between the inner and the outer sheath so as to effectively transmit the axial load applied to the cable, while enabling a sufficiently low peeling force allowing an easy and quick peeling when the cable is being installed indoor.

The invention claimed is:
1. A telecommunication cable comprising at least one optical fibre unit surrounded by a low fire hazard halogen free polymeric inner sheath covered by and in contact with a peelable, environmentally resistant polymer outer sheath, at least two discrete strength members being embedded in the low fire hazard halogen free polymeric inner sheath.

2. The telecommunication cable according to claim 1, wherein the at least one optical fibre unit is stranded with at least one stranding element.

3. The telecommunication cable according to claim 2, wherein at least one stranding element is selected from an optical fibre unit; a metallic wire or strand or twisted pair; and a polymeric rod or tube.

4. The telecommunication cable according to claim 1, wherein the inner sheath has an outer surface with at least one groove.

5. The telecommunication cable according to claim 1, wherein the outer sheath is made of polyethylene.

6. The telecommunication cable according to claim 1, wherein each of the discrete strength members comprises an element selected from a single rod or wire; and a strand comprising two or more stranded elongated elements.

7. The telecommunication cable according to claim 1, wherein the discrete strength members comprise a material selected from dielectric material and metal.

8. The telecommunication cable according to claim 7, wherein the discrete strength members are metal.

9. The telecommunication cable according to claim 1, wherein the discrete strength members are two diametrically opposed strength members.

10. The telecommunication cable according to claim 1, wherein the cable has an outer diameter, and the outer sheath has a thickness of at most 10% of said outer diameter.

11. The telecommunication cable according to claim 1, wherein the cable is intended for outdoor and indoor use.

12. The telecommunication cable according to claim 11, wherein the cable is intended for aerial and indoor use.

13. A method for installing a telecommunication cable comprising at least one optical fibre unit surrounded by a low fire hazard halogen free polymeric inner sheath that is covered by and in contact with a peelable, environmentally resistant polymer outer sheath, at least two discrete strength members being embedded into the low fire hazard halogen free polymeric inner sheath, comprising:

securing the cable to an outdoor pole;
laying a first length of the cable from the outdoor pole to an indoor location;
laying a second length of the cable within the indoor location and, for said second length, peeling the outer sheath off the inner sheath while leaving the at least two diametrically opposed strength members embedded inside the inner sheath.

14. A process for manufacturing a telecommunication cable for indoor and outdoor use, said cable comprising at least one optical fibre unit surrounded by a low fire hazard halogen free polymeric inner sheath that is covered by and in contact with a peelable, environmentally resistant polymer outer sheath, comprising:

coupling the at least one optical fibre unit with at least one stranding element to obtain a stranded unit;
extruding an inner sheath layer over the stranded unit;
embedding at least two discrete strength members within said inner sheath layer; and
extruding the outer sheath layer over and in contact with the inner sheath.

15. A process for manufacturing a telecommunication cable for indoor and outdoor use, said cable comprising at least one optical fibre unit surrounded by a low fire hazard halogen free polymeric inner sheath covered by and in contact with a peelable, environmentally resistant polymer outer sheath, at least two discrete strength members being embedded in the low fire hazard halogen free polymeric inner sheath, comprising coextruding the inner sheath layer and the outer sheath layer.

16. The process for manufacturing a telecommunication cable according to claim 15, wherein the outer sheath layer is extruded over the inner sheath layer when the inner sheath layer has a temperature decreased no more than 10% from the extrusion temperature of said inner sheath layer.

17. The process for manufacturing a telecommunication cable according to claim 15, wherein an extrusion temperature of the outer sheath layer is from 40° C. to 70° C. higher than a temperature of the inner sheath layer where the outer sheath layer is extruded over the inner sheath layer.

* * * * *